United States Patent [19]

Park

[11] Patent Number: 5,653,397

[45] Date of Patent: Aug. 5, 1997

[54] REEL BRAKE DEVICE USING A SET OF MAGNETIC RUBBERS IN VIDEO CASSETTE RECORDER

[75] Inventor: Jong-Sung Park, Seoul, Rep. of Korea

[73] Assignee: Daewoo Electronics Co., Ltd., Seoul, Rep. of Korea

[21] Appl. No.: 515,613

[22] Filed: Aug. 16, 1995

[30] Foreign Application Priority Data

Oct. 31, 1994 [KR] Rep. of Korea .................. 94-28736

[51] Int. Cl.⁶ ........................................................ G03B 1/04
[52] U.S. Cl. ............................... 242/355.1; 188/267
[58] Field of Search ........................... 242/355.1, 396.6, 242/422.2; 360/74.1; 188/161, 267

[56] References Cited

U.S. PATENT DOCUMENTS 4,079,899  3/1978  Vogel ................................ 242/355.1

Primary Examiner—John P. Darling
Attorney, Agent, or Firm—Pennie & Edmonds LLP

[57] ABSTRACT

A reel brake device for use in a video cassette recorder comprises a magnetic rubber set in order to ensure a speedy action of a brake lever and to reinforce the braking force. The magnetic rubber set consists of a ring-shaped magnetic rubber mounted around a brake drum of a reel table and a magnetic rubber brake block attached to the brake lever. The magnetic rubber brake block has an opposite magnetic pole to the ring-shaped magnetic rubber and an arc-profiled abutting surface for engaging with the ring-shaped magnetic rubber.

3 Claims, 1 Drawing Sheet

REEL BRAKE DEVICE USING A SET OF MAGNETIC RUBBERS IN VIDEO CASSETTE RECORDER

FIELD OF THE INVENTION

The present invention is directed to a reel brake device for use in a video cassette recorder; and, more particularly, to a reel brake device having an improved rapid brakability by incorporating therein a set of magnetic rubbers.

DESCRIPTION OF THE PRIOR ART

A conventional video cassette recorder(VCR) may be operated in various modes to record and reproduce video images. In such a VCR, it is required that a reel brake device therein comprising a reel brake mechanism and a reel table be able to execute a rapid braking at a conversion of the operating mode.

In FIG. 1, there is shown one of the prior art reel braking devices 10, comprising a reel brake mechanism including a brake lever 11 with a plurality of teeth 12 at its distal end, a reel table 21 with a set of matching teeth 22 and a spring 31.

One of the major problems associated with the above described reel brake device 10 is that since the rapid braking of the reel table 21 is achieved by engaging physically the set of matching teeth 22 with the plurality of teeth 12 on the brake lever 11, forcing the two sets of teeth 12 and 22 to bear a concentrated stress. As a result, some of the teeth 12 and 22 on the reel table 21 and the brake lever 11 are bound to wear down, which will in turn reduce the ability of the reel brake device 10 to execute its primary function.

SUMMARY OF THE INVENTION

It is, therefore, a primary object of the invention to provide a reel brake device capable of maintaining its functional integrity over an extended period of time.

It is another object of the present invention to provide a reel brake device capable of performing rapid braking without engaging physically the teeth on the reel table with those of the brake lever.

In accordance with one aspect of the present invention, there is provided an improved reel brake device for use in a video cassette recorder of the type including a reel table having a brake drum protrusively formed from a top plane thereof and a brake lever adapted for pivotal movements toward and away from the reel table, wherein the improvement comprises: i) a ring-shaped magnetic rubber fixed around the brake drum; and ii) a magnetic rubber brake block having an arc-profiled abutting surface of an identical curvature to the ring-shaped magnetic rubber, the arc-profiled abutting surface so arranged as to engage with the ring-shaped magnetic rubber depending upon the pivotal movement of the brake lever, and the magnetic rubber brake block having an opposite magnetic pole to the ring-shaped magnetic rubber.

BRIEF DESCRIPTION OF THE DRAWINGS

The above and other objects and features of the present invention will become apparent from the following description of preferred embodiments when taken in conjunction with the accompanying drawings, in which.

DETAILED DESCRIPTION OF THE PREFERRED EMBODIMENTS

Figure 1:
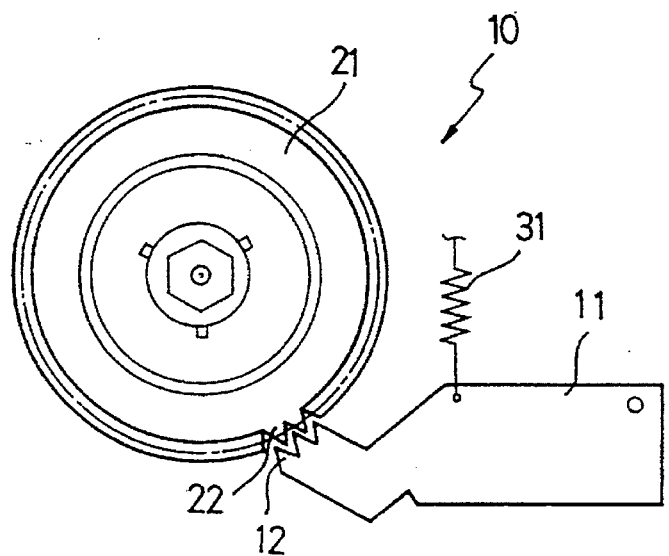
FIG. 1 shows a schematic top view of one of the prior art reel brake devices.
Figure 2:
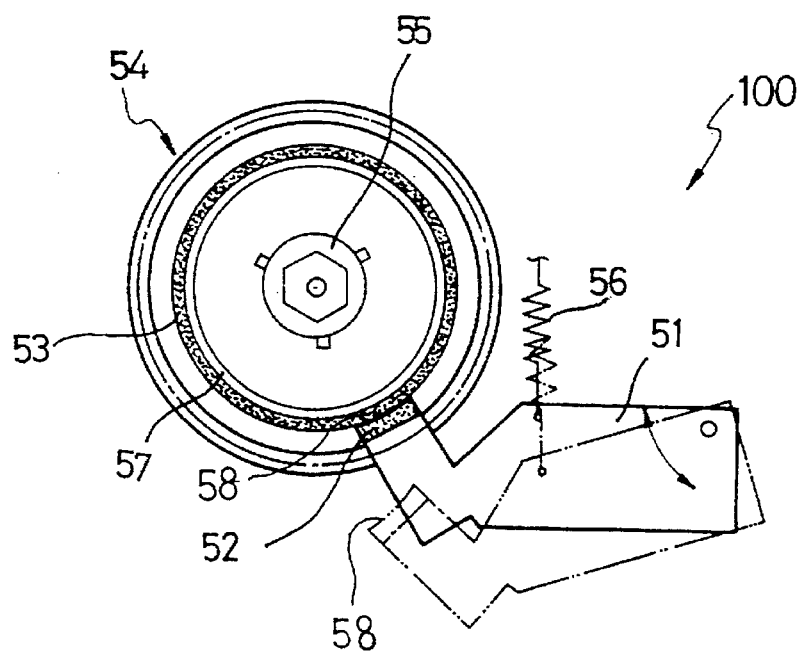
FIG. 2 represents a schematic top view of a reel brake device in accordance with the present invention.

A reel brake device 100 in accordance with the present invention is illustrated in FIG. 2. The inventive reel brake device 100 is provided with a reel table 54 and a brake lever 51. The reel table 54 integrated with a reel 55 has a brake drum 57 protrusively formed from a top plane of the reel table 54. The brake drum 57 together with the reel table 54 has a coaxial relationship with the reel 55. Fixed around the brake drum 57 is a ring-shaped magnetic rubber 53 which is of a synthetic rubber containing therein a magnetic metal, e.g., ferrum, nickel, cobalt, etc., powder and structured in a ring-shaped configuration. A lateral periphery of the ring-shaped magnetic rubber 53 functions as a friction surface for braking.

The brake lever 51 is pivotably mounted on a deck (not shown) and provided with a magnetic rubber brake block 52. The magnetic rubber brake block 52 is made of the same material as the ring-shaped magnetic rubber 53, i.e., the synthetic rubber, but has an opposite magnetic pole to the magnetic rubber 53. Further, the magnetic rubber brake block 52 has an arc-shaped abutting surface 58 with a curvature identical to that of the ring-shaped magnetic rubber 53. The arc-shaped abutting surface 58 functions as another friction surface for braking.

Reference numeral 56 represents a coil spring which is adapted to bias the brake lever 51 toward the reel table 54.

To operate the inventive reel brake device 100, initially, the brake lever 51 is positioned to be detached from the reel table 54, as indicated with a dotted line in FIG. 2. In order to keep the brake lever 51 detached from the reel table 54, a cam gear(not shown) or the like is provided on the deck, to thereby depress or pull a portion of the brake lever 51. Then, if the brake lever 51 is released from the cam gear, it is rotated toward the brake drum 57 by a resilient force of the spring 56 aided by the magnetic force between the ring-shaped magnetic rubber 53 and the magnetic rubber brake block 52.

The magnetic force of the ring-shaped magnetic rubber 53 and the magnetic rubber brake block 52 not only augments the friction force for braking but also causes the brake lever 51 to rapidly pivot toward the reel table 54. Specifically, since the magnetic rubber has a high degree of friction factor, the employment of the magnetic rubber set 52 and 53 results in an improved braking effect.

Although the invention has been shown and described with respect to the preferred embodiments, it will be understood by those skilled in the art that various changes and modifications may be made without departing from the spirit and scope of the invention as defined in the following claims.

What is claimed is:

1. In an improved reel brake device for use in a video cassette recorder of the type including a reel table having a brake drum protrusively formed from a top plane thereof and a brake lever adapted for a pivotal movement toward or away from the reel table, wherein the improvement comprises:

a ring-shaped magnetic rubber fixed around the brake drum; and a magnetic rubber brake block having an arc-profiled abutting surface of an identical curvature to the ring-shaped magnetic rubber, the arc-profiled abutting surface so arranged as to engage with the ring-shaped magnetic rubber depending upon the pivotal movement of the brake lever, and the magnetic rubber brake block having an opposite magnetic pole to the ring-shaped magnetic rubber.

2. The reel brake device as recited in claim 1, wherein the ring-shaped magnetic rubber and the magnetic rubber brake block contain a magnetic metal, respectively.

3. The reel brake device as recited in claim 2, wherein said magnetic metal is selected from the group consisting of ferrum, cobalt and nickel.

* * * * *